(12) United States Patent
Yu et al.

(10) Patent No.: US 12,449,271 B2
(45) Date of Patent: Oct. 21, 2025

(54) CROWD-SOURCING LANE LINE MAPS FOR A VEHICLE

(71) Applicant: GM Global Technology Operations LLC, Detroit, MI (US)

(72) Inventors: Bo Yu, Troy, MI (US); Gui Chen, Sterling Heights, MI (US); Shuqing Zeng, Sterling Heights, MI (US); Joon Hwang, Pflugerville, TX (US); Carl P. Darukhanavala, Royal Oak, MI (US); Carolyn Heather MacLeod, Thornhill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 102 days.

(21) Appl. No.: 18/530,686

(22) Filed: Dec. 6, 2023

(65) Prior Publication Data

US 2025/0189340 A1 Jun. 12, 2025

(51) Int. Cl.
*G01C 21/00* (2006.01)
*G06V 20/56* (2022.01)

(52) U.S. Cl.
CPC ....... *G01C 21/3815* (2020.08); *G06V 20/588* (2022.01)

(58) Field of Classification Search
CPC .......................... G01C 21/3815; G06V 20/588
USPC ........................................................ 701/532
See application file for complete search history.

(56) References Cited

U.S. PATENT DOCUMENTS

| 11,326,889 B2 | 5/2022 | Kim |
| 2004/0114379 A1 | 6/2004 | Miller et al. |
| 2014/0324339 A1 | 10/2014 | Adam et al. |
| 2016/0102986 A1 | 4/2016 | Ma et al. |
| 2018/0154901 A1 | 6/2018 | Hasberg et al. |
| 2019/0122386 A1 | 4/2019 | Wheeler et al. |
| 2019/0154842 A1 | 5/2019 | Adachi |
| 2020/0249332 A1 | 8/2020 | Pandey et al. |
| 2020/0363218 A1 | 11/2020 | Kim |
| 2021/0158547 A1 | 5/2021 | He et al. |
| 2021/0370968 A1* | 12/2021 | Xiao ............... G01S 7/4808 |
| 2022/0163346 A1* | 5/2022 | Han ................ G06V 20/588 |

(Continued)

FOREIGN PATENT DOCUMENTS

WO 2019207160 A1 10/2019

OTHER PUBLICATIONS

United States Patent and Trademark Office. U.S. Appl. No. 17/930,503, filed Sep. 8, 2022.

(Continued)

*Primary Examiner* — Mahmoud S Ismail
(74) *Attorney, Agent, or Firm* — Vivacqua Crane, PLLC

(57) ABSTRACT

A method for crowd-sourcing lane line map data for a vehicle may include receiving a plurality of observations. The plurality of observations includes at least a first observation and a second observation. The method further may include generating a point cloud alignment vector based at least in part on the plurality of observations. The method further may include generating an optimized aligned point cloud based at least in part on the point cloud alignment vector. The method further may include determining a lane line map based at least in part on the optimized aligned point cloud. The method further may include updating a map database based at least in part on the lane line map.

9 Claims, 7 Drawing Sheets

(56) References Cited

U.S. PATENT DOCUMENTS

| | | |
|---|---|---|
| 2022/0198706 A1 | 6/2022 | Su et al. |
| 2022/0205783 A1* | 6/2022 | Chen .................. G06V 20/58 |
| 2023/0034574 A1* | 2/2023 | Xie ..................... G01C 21/26 |
| 2023/0060542 A1 | 3/2023 | Friedrich et al. |
| 2023/0148050 A1* | 5/2023 | Lv .................. G06F 21/6245 |
| | | 701/532 |
| 2023/0196759 A1* | 6/2023 | Hong ................ G06V 10/757 |
| | | 382/157 |
| 2024/0011794 A1* | 1/2024 | Song .................. G06V 20/70 |
| 2024/0182035 A1 | 6/2024 | Lin |
| 2024/0317254 A1 | 9/2024 | Tran |

OTHER PUBLICATIONS

United States Patent and Trademark Office. U.S. Appl. No. 18/359,017, filed Jul. 26, 2023.

Song, H., et al. "A Lightweight High Definition Mapping Method Based on Multi-Source Data Fusion Perception," Applied Sciences, 2023, vol. 13, pp. 1-17.

\* cited by examiner

CROWD-SOURCING LANE LINE MAPS FOR A VEHICLE

The present disclosure relates to advanced driver assistance and automated driving systems and methods for vehicles.

To increase occupant awareness and convenience, vehicles may be equipped with advanced driver assistance systems (ADAS) and/or automated driving systems (ADS). ADAS systems may use various sensors such as cameras, radar, and LiDAR to detect and identify objects around the vehicle, including other vehicles, pedestrians, road configurations, traffic signs, and road markings. ADAS systems may take actions based on environmental conditions surrounding the vehicle, such as applying brakes or alerting an occupant of the vehicle. However, current ADAS systems may not account for additional factors which may affect occupant experience. ADS systems may use various sensors to detect objects in the environment around the vehicle and control the vehicle to navigate the vehicle through the environment to a predetermined destination. However, current ADAS and ADS systems may rely on accurate interpretation of road markings, such as, for example, lane markings, for optimal operation.

Thus, while ADAS and ADS systems and methods achieve their intended purpose, there is a need for a new and improved system and method for crowd-sourcing lane line map data for a vehicle.

SUMMARY

According to several aspects, a method for crowd-sourcing lane line map data for a vehicle is provided. The method may include receiving a plurality of observations. The plurality of observations includes at least a first observation and a second observation. The method further may include generating a point cloud alignment vector based at least in part on the plurality of observations. The method further may include generating an optimized aligned point cloud based at least in part on the point cloud alignment vector. The method further may include determining a lane line map based at least in part on the optimized aligned point cloud. The method further may include updating a map database based at least in part on the lane line map.

In another aspect of the present disclosure, receiving the plurality of observations further may include receiving the plurality of observations from one or more vehicles. Each of the plurality of observations includes a vehicle location trajectory and a plurality of points positioned relative to the vehicle location trajectory. Each point of the plurality of points includes a plurality of point characteristics. One of the plurality of point characteristics is a location of each point relative to the vehicle location trajectory. Each of the plurality of points corresponds to an object in an environment surrounding the one or more vehicles.

In another aspect of the present disclosure, generating the point cloud alignment vector further may include generating the point cloud alignment vector using a point cloud registration algorithm.

In another aspect of the present disclosure, generating the point cloud alignment vector using the point cloud registration algorithm further may include determining the point cloud alignment vector such that shifting the vehicle location trajectory of the second observation by the point cloud alignment vector aligns the vehicle location trajectory of the second observation with the vehicle location trajectory of the first observation.

In another aspect of the present disclosure, generating the optimized aligned point cloud further may include determining a plurality of correction vectors. Each of the plurality of correction vectors corresponds to one of the plurality of points of the second observation. Generating the optimized aligned point cloud further may include shifting each of the plurality of points of the second observation to generate the optimized aligned point cloud. Each of the plurality of points of the second observation is shifted based at least in part on one of the plurality of correction vectors.

In another aspect of the present disclosure, determining the plurality of correction vectors further may include minimizing an objective function to determine the plurality of correction vectors. The objective function includes at least a plurality of cost functions. Each of the plurality of cost functions depends at least in part on the plurality of correction vectors. Each of the plurality of cost functions corresponds to one of a plurality of optimization constraints. The plurality of optimization constraints includes at least an observation similarity constraint, a trajectory pose constraint, and a location vicinity constraint.

In another aspect of the present disclosure, minimizing the objective function further may include minimizing the objective function to determine the plurality of correction vectors. The objective function includes at least a plurality of cost functions. The plurality of cost functions further includes an observation similarity constraint cost function. The observation similarity constraint cost function is:

$$\text{Cost}_{ob}(c_i) = \frac{c_i - C_i}{\sigma_{ob}^2(i)}$$

where $\text{Cost}_{ob}(c_i)$ is the observation similarity constraint cost function for one of the plurality of correction vectors corresponding to an ith point of the plurality of points of the second observation, $c_i$ is one of the plurality of correction vectors corresponding to an ith point of the plurality of points of the second observation, $C_i$ is the point cloud alignment vector for the ith point of the plurality of points of the second observation, and $\sigma_{ob}^2(i)$ is an alignment variance of the ith point of the plurality of points of the second observation. The plurality of cost functions further includes a trajectory pose constraint cost function. The trajectory pose constraint cost function is:

$$\text{Cost}_{pose}(c_i) = \frac{f_{pose}(c_i, c_{i+1}) - f_{pose}(\dot{c}_i, \dot{c}_{i+1})}{\sigma_{pose}^2(i)}$$

where $\text{Cost}_{pose}(c_i)$ is the trajectory pose constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is an initial correction vector corresponding to the ith point of the plurality of points of the second observation, $f_{pose}(c_i, c_{i+1})$ is a heading between the ith point of the plurality of points of the second observation and an i+1th point of the plurality of points of the second observation after application of one of the plurality of correction vectors, $f_{pose}(\dot{c}_i, \dot{c}_{i+1})$ is a heading between the ith point of the plurality of points of the second observation and the i+1th point of the plurality of points of the second observation after application of the initial correction vector, and $\sigma_{pose}^2(i)$ is a pose variance of the ith point of the plurality of points of the second observation. The plurality of cost functions further includes a location vicinity constraint cost function. The location vicinity constraint cost function is:

$$\text{Cost}_{loc}(c_i) = \frac{\text{euclidian}(c_i, \dot{c}_i)}{\sigma_{loc}^2(i)}$$

where $\text{Cost}_{loc}(c_i)$ is the location vicinity constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is the initial correction vector corresponding to the ith point of the plurality of points of the second observation, euclidian($c_i,\dot{c}_i$), is a Euclidean distance between a location of the ith point after application of one of the plurality of correction vectors and a location of the ith point after application of the initial correction vector, and $\sigma_{loc}^2(i)$ is an location variance of the ith point of the plurality of points of the second observation.

In another aspect of the present disclosure, minimizing the objective function further may include minimizing the objective function to determine the plurality of correction vectors. The objective function further includes:

$$F(c_1, c_2, \ldots, c_n) = \sum_{c_i} \left( \text{Cost}_{ob}(c_i)^2 + \text{Cost}_{pose}(c_i)^2 + \text{Cost}_{loc}(c_i)^2 \right)$$

where $F(c_1, c_2, \ldots, c_n)$ is the objective function, $c_1, c_2, \ldots, c_n$ are the plurality of correction vectors, $c_i$ is one of the plurality of correction vectors corresponding to the ith point of the plurality of points of the second observation, $\text{Cost}_{ob}(c_i)$ is the observation similarity constraint cost function for one of the plurality of correction vectors corresponding to the ith point of the plurality of points of the second observation, $\text{Cost}_{pose}(c_i)$ is the trajectory pose constraint cost function for one of the plurality of correction vectors corresponding to the ith point of the plurality of points of the second observation, and $\text{Cost}_{loc}(c_i)$ is the location vicinity constraint cost function for one of the plurality of correction vectors corresponding to the ith point of the plurality of points of the second observation.

In another aspect of the present disclosure, minimizing the objective function to determine the plurality of correction vectors further may include adjusting the plurality of correction vectors using an iterative optimization algorithm to minimize the objective function.

In another aspect of the present disclosure, the iterative optimization algorithm is a factor graph optimization algorithm. Adjusting the plurality of correction vectors using the iterative optimization algorithm further may include generating a factor graph. The factor graph includes a plurality of variable nodes, a plurality of factor nodes, and a plurality of edges linking variable nodes and factor nodes. Each of the plurality of variable nodes represents one of the plurality of correction vectors. Each of the plurality of factor nodes represents one of the plurality of optimization constraints. Each of the plurality of edges represents one of the plurality of cost functions. Adjusting the plurality of correction vectors using the iterative optimization algorithm further may include updating one or more of the plurality of variable nodes using an iterative process until a convergence condition is satisfied.

According to several aspects, a system for crowd-sourcing lane line map data for a vehicle is provided. The system may include a server communication system, a map database, and a server controller in electrical communication with the server communication system and the map database. The server controller is programmed to receive a plurality of observations using the server communication system. The plurality of observations includes at least a first observation and a second observation. The server controller is further programmed to generate a point cloud alignment vector based at least in part on the plurality of observations. The server controller is further programmed to generate an optimized aligned point cloud based at least in part on the point cloud alignment vector. The server controller is further programmed to determine a lane line map based at least in part on the optimized aligned point cloud. The server controller is further programmed to update the map database based at least in part on the lane line map.

In another aspect of the present disclosure, to receive the plurality of observations using the server communication system, the server controller is further programmed to receive the plurality of observations from one or more vehicles using the server communication system. Each of the plurality of observations includes a vehicle location trajectory and a plurality of points positioned relative to the vehicle location trajectory. Each point of the plurality of points includes a plurality of point characteristics. One of the plurality of point characteristics is a location of each point relative to the vehicle location trajectory. Each of the plurality of points corresponds to an object in an environment surrounding the one or more vehicles.

In another aspect of the present disclosure, to generate the optimized aligned point cloud, the server controller is further programmed to determine a plurality of correction vectors. Each of the plurality of correction vectors corresponds to one of the plurality of points of the second observation. To generate the optimized aligned point cloud, the server controller is further programmed to shift each of the plurality of points of the second observation to generate the optimized aligned point cloud. Each of the plurality of points of the second observation is shifted based at least in part on one of the plurality of correction vectors.

In another aspect of the present disclosure, to determine the plurality of correction vectors, the server controller is further programmed to minimize an objective function to determine the plurality of correction vectors. The objective function includes at least a plurality of cost functions. Each of the plurality of cost functions depends at least in part on the plurality of correction vectors. Each of the plurality of cost functions corresponds to one of a plurality of optimization constraints. The plurality of optimization constraints includes at least an observation similarity constraint, a trajectory pose constraint, and a location vicinity constraint.

In another aspect of the present disclosure, the plurality of cost functions further includes an observation similarity constraint cost function. The observation similarity constraint cost function is:

$$\text{Cost}_{ob}(c_i) = \frac{c_i - C_i}{\sigma_{ob}^2(i)}$$

where $Cost_{ob}(c_i)$ is the observation similarity constraint cost function for one of the plurality of correction vectors corresponding to an ith point of the plurality of points of the second observation, $c_i$ is one of the plurality of correction vectors corresponding to an ith point of the plurality of points of the second observation, $C_i$ is the point cloud alignment vector for the ith point of the plurality of points of the second observation, and $\sigma_{ob}^2(i)$ is an alignment variance of the ith point of the plurality of points of the second observation. The plurality of cost functions further includes a trajectory pose constraint cost function. The trajectory pose constraint cost function is:

$$Cost_{pose}(c_i) = \frac{f_{pose}(c_i, c_{i+1}) - f_{pose}(\dot{c}_i, \dot{c}_{i+1})}{\sigma_{pose}^2(i)}$$

where $Cost_{pose}(c_i)$ is the trajectory pose constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is an initial correction vector corresponding to the ith point of the plurality of points of the second observation, $f_{pose}(c_i, c_{i+1})$ is a heading between the ith point of the plurality of points of the second observation and an i+1th point of the plurality of points of the second observation after application of one of the plurality of correction vectors, $f_{pose}(\dot{c}_i, \dot{c}_{i+1})$ is a heading between the ith point of the plurality of points of the second observation and the i+1th point of the plurality of points of the second observation after application of the initial correction vector, and $\sigma_{pose}^2(i)$ is a pose variance of the ith point of the plurality of points of the second observation. The plurality of cost functions further includes a location vicinity constraint cost function. The location vicinity constraint cost function is:

$$Cost_{loc}(c_i) = \frac{\text{euclidian}(c_i, \dot{c}_i)}{\sigma_{loc}^2(i)}$$

where $Cost_{loc}(c_i)$ is the location vicinity constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is the initial correction vector corresponding to the ith point of the plurality of points of the second observation, euclidian$(c_i, \dot{c}_i)$, is a Euclidian distance between a location of the ith point after application of one of the plurality of correction vectors and a location of the ith point after application of the initial correction vector, and $\sigma_{loc}^2(i)$ is an location variance of the ith point of the plurality of points of the second observation.

In another aspect of the present disclosure, the objective function is based at least in part on the plurality of cost functions. The objective function is:

$$F(c_1, c_2, \ldots, c_n) = \sum_{c_i} \left( Cost_{ob}(c_i)^2 + Cost_{pose}(c_i)^2 + Cost_{loc}(c_i)^2 \right)$$

where $F(c_1, c_2, \ldots, c_n)$ is the objective function, $c_1, c_2, \ldots, c_n$ are the plurality of correction vectors, $c_i$ is one of the plurality of correction vectors corresponding to the ith point of the plurality of points of the second observation, $Cost_{ob}(c_i)$ is the observation similarity constraint cost function for one of the plurality of correction vectors corresponding to the ith point of the plurality of points of the second observation, $Cost_{pose}(c_i)$ is the trajectory pose constraint cost function for one of the plurality of correction vectors corresponding to the ith point of the plurality of points of the second observation, and $Cost_{loc}(c_i)$ is the location vicinity constraint cost function for one of the plurality of correction vectors corresponding to the ith point of the plurality of points of the second observation.

In another aspect of the present disclosure, to minimize the objective function, the server controller is further programmed to generate a factor graph. The factor graph includes a plurality of variable nodes, a plurality of factor nodes, and a plurality of edges linking variable nodes and factor nodes. Each of the plurality of variable nodes represents one of the plurality of correction vectors. Each of the plurality of factor nodes represents one of the plurality of optimization constraints. Each of the plurality of edges represents one of the plurality of cost functions. To minimize the objective function, the server controller is further programmed to update one or more of the plurality of variable nodes to determine the plurality of correction vectors using an iterative process until a convergence condition is satisfied.

According to several aspects, a method for crowd-sourcing lane line map data for a vehicle is provided. The method may include receiving a plurality of observations from one or more vehicles. Each of the plurality of observations includes a vehicle location trajectory and a plurality of points positioned relative to the vehicle location trajectory. Each point of the plurality of points includes a plurality of point characteristics. One of the plurality of point characteristics is a location of each point relative to the vehicle location trajectory. Each of the plurality of points corresponds to an object in an environment surrounding the one or more vehicles. The method further may include generating a point cloud alignment vector based at least in part on the plurality of observations using a point cloud registration algorithm. Shifting the vehicle location trajectory of a second observation by the point cloud alignment vector aligns the vehicle location trajectory of the second observation with the vehicle location trajectory of the first observation. The method further may include determining a plurality of correction vectors. Each of the plurality of correction vectors corresponds to one of the plurality of points of the second observation. The method further may include shifting each of the plurality of points of the second observation to generate an optimized aligned point cloud. Each of the plurality of points of the second observation is shifted based at least in part on one of the plurality of correction vectors. The method further may include determining a lane line map based at least in part on the optimized aligned point cloud. The method further may include updating a map database based at least in part on the lane line map.

In another aspect of the present disclosure determining the plurality of correction vectors further may include determining an observation similarity constraint cost function based at least in part on an observation similarity constraint. The observation similarity constraint cost function is:

$$\text{Cost}_{ob}(c_i) = \frac{c_i - C_i}{\sigma_{ob}^2(i)}$$

where $\text{Cost}_{ob}(c_i)$ is the observation similarity constraint cost function for one of the plurality of correction vectors corresponding to an ith point of the plurality of points of the second observation, $c_i$ is one of the plurality of correction vectors corresponding to an ith point of the plurality of points of the second observation, $C_i$ is the point cloud alignment vector for the ith point of the plurality of points of the second observation, and $\sigma_{ob}^2(i)$ is an alignment variance of the ith point of the plurality of points of the second observation. Determining the plurality of correction vectors further may include determining a trajectory pose constraint cost function. The trajectory pose constraint cost function is:

$$\text{Cost}_{pose}(c_i) = \frac{f_{pose}(c_i, c_{i+1}) - f_{pose}(\dot{c}_i, \dot{c}_{i+1})}{\sigma_{pose}^2(i)}$$

where $\text{Cost}_{pose}(c_i)$ is the trajectory pose constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is an initial correction vector corresponding to the ith point of the plurality of points of the second observation, $f_{pose}(c_i, c_{i+1})$ is a heading between the ith point of the plurality of points of the second observation and an i+1th point of the plurality of points of the second observation after application of one of the plurality of correction vectors, $f_{pose}(\dot{c}_i, \dot{c}_{i+1})$ is a heading between the ith point of the plurality of points of the second observation and the i+1th point of the plurality of points of the second observation after application of the initial correction vector, and $\sigma_{pose}^2(i)$ is a pose variance of the ith point of the plurality of points of the second observation. Determining the plurality of correction vectors further may include determining a location vicinity constraint cost function. The location vicinity constraint cost function is:

$$\text{Cost}_{loc}(c_i) = \frac{\text{euclidian}(c_i, \dot{c}_i)}{\sigma_{loc}^2(i)}$$

where $\text{Cost}_{loc}(c_i)$ is the location vicinity constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is the initial correction vector corresponding to the ith point of the plurality of points of the second observation, $\text{euclidian}(c_i, \dot{c}_i)$, is a Euclidian distance between a location of the ith point after application of one of the plurality of correction vectors and a location of the ith point after application of the initial correction vector, and $\sigma_{loc}^2(i)$ is an location variance of the ith point of the plurality of points of the second observation. Determining the plurality of correction vectors further may include determining an objective function based at least in part on the observation similarity constraint cost function, the trajectory pose constraint cost function, and the location vicinity constraint cost function. The objective function is:

$$F(c_1, c_2, \ldots, c_n) = \sum_{c_i} \left( \text{Cost}_{ob}(c_i)^2 + \text{Cost}_{pose}(c_i)^2 + \text{Cost}_{loc}(c_i)^2 \right)$$

where $F(c_1, c_2, \ldots, c_n)$ is the objective function, $c_1, c_2, \ldots, c_n$ are the plurality of correction vectors, $c_i$ is one of the plurality of correction vectors corresponding to the ith point of the plurality of points of the second observation, $\text{Cost}_{ob}(c_i)$ is the observation similarity constraint cost function for one of the plurality of correction vectors corresponding to the ith point of the plurality of points of the second observation, $\text{Cost}_{pose}(c_i)$ is the trajectory pose constraint cost function for one of the plurality of correction vectors corresponding to the ith point of the plurality of points of the second observation, and $\text{Cost}_{loc}(c_i)$ is the location vicinity constraint cost function for one of the plurality of correction vectors corresponding to the ith point of the plurality of points of the second observation. Determining the plurality of correction vectors further may include minimizing the objective function to determine the plurality of correction vectors.

In another aspect of the present disclosure, minimizing the objective function further may include generating a factor graph. The factor graph includes a plurality of variable nodes, a plurality of factor nodes, and a plurality of edges linking variable nodes and factor nodes. Each of the plurality of variable nodes represents one of the plurality of correction vectors. Each of the plurality of factor nodes represents one of the observation similarity constraint, the trajectory pose constraint, and the location vicinity constraint. Each of the plurality of edges represents one of the observation similarity constraint cost function, the trajectory pose constraint cost function, and the location vicinity constraint cost function. Minimizing the objective function further may include updating one or more of the plurality of variable nodes using an iterative process until a convergence condition is satisfied.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, road markings, such as, for example, lane lines, are an important element of road infrastructure used to communicate vital information, such as, for example, road edge location, to drivers. In aspects of the present disclosure, vehicles may use perception sensor systems such as, for example, camera systems to acquire information about lane lines. Information about lane lines acquired by vehicle perception sensor systems may be used to provide features such as automated driving systems (ADS), advanced driver assistance systems (ADAS), and/or the like. However, location error (e.g., GPS error) may cause misalignment between multiple lane line observations gathered by vehicle perception sensor systems. Therefore, the present disclosure provides a new and improved method for acquiring and aggregating lane line data from multiple vehicles to generate lane line maps, including the use of factor graph optimization for increased accuracy and reduction of misalignments (e.g., GPS error) between lane line observations.

Figure 1:
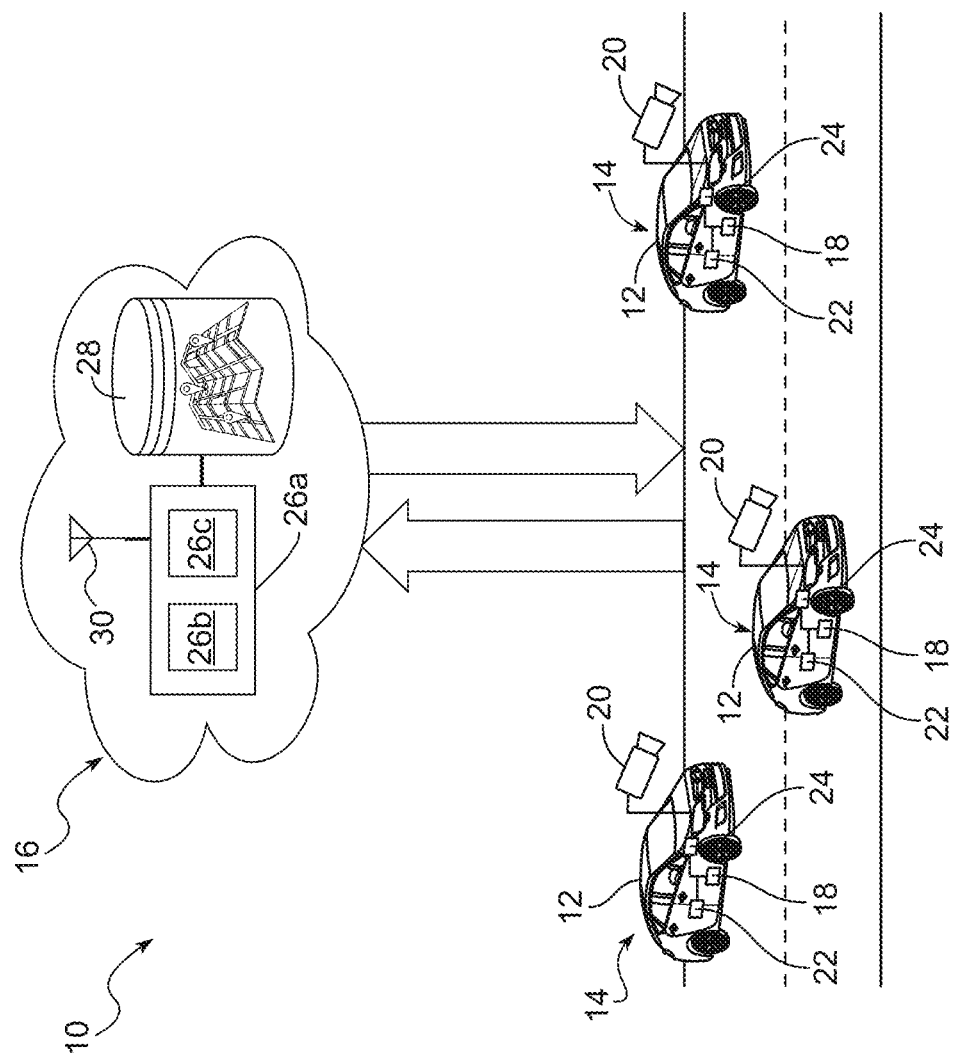
FIG. 1 is a schematic diagram of a system for crowdsourcing lane line map data, according to an exemplary embodiment.

Referring to FIG. 1, a schematic diagram of a system 10 for crowd-sourcing lane line map data is shown. The system 10 includes one or more vehicles 12, each of the one or more vehicles 12 including a vehicle system 14. The system 10 further includes a server system 16.

The vehicle system 14 includes a vehicle controller 18, a camera system 20, a global navigation satellite system (GNSS) 22, and a vehicle communication system 24.

The vehicle controller 18 is used to implement a method 100 for crowd-sourcing lane line map data, as will be described below. The vehicle controller 18 includes at least one processor and a non-transitory computer readable storage device or media. The processor may be a custom made or commercially available processor, a central processing unit (CPU), a graphics processing unit (GPU), an auxiliary processor among several processors associated with the vehicle controller 18, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 18 to control various systems of the vehicle 12. The vehicle controller 18 may also consist of multiple controllers which are in electrical communication with each other. The vehicle controller 18 may be interconnected with additional systems and/or controllers of the vehicle 12, allowing the vehicle controller 18 to access data such as, for example, speed, acceleration, braking, and steering angle of the vehicle 12.

The vehicle controller 18 is in electrical communication with the camera system 20, GNSS 22, and the vehicle communication system 24. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 18 are within the scope of the present disclosure.

The camera system 20 is used to capture images and/or videos of the environment surrounding the vehicle 12. In an exemplary embodiment, the camera system 20 includes a photo and/or video camera which is positioned to view the environment surrounding the vehicle 12. In a non-limiting example, the camera system 20 includes cameras affixed inside of the vehicle 12, for example, in a headliner of the vehicle 12, having a view through the windscreen. In another non-limiting example, the camera system 20 includes cameras affixed outside of the vehicle 12, for example, on a roof of the vehicle 12, having a view of the environment in front of the vehicle 12.

In another exemplary embodiment, the camera system 20 is a surround view camera system including a plurality of cameras (also known as satellite cameras) arranged to provide a view of the environment adjacent to all sides of the vehicle 12. In a non-limiting example, the camera system 20 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 20 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The GNSS 22 is used to determine a geographical location of the vehicle 12. In an exemplary embodiment, the GNSS 22 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 22 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 22. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 22 may be integrated with the vehicle controller 18 (e.g., on a same circuit board with the vehicle controller 18 or otherwise a part of the vehicle controller 18) without departing from the scope of the present disclosure.

The vehicle communication system 24 is used by the vehicle controller 18 to communicate with other systems external to the vehicle 12. For example, the vehicle communication system 24 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 24 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 24 may further include an embedded universal integrated circuit card (eUICC) configured to store at least one cellular connectivity configuration profile, for example, an embedded subscriber identity module (eSIM) profile. The vehicle communication system 24 is further configured to communicate via a personal area network (e.g., BLUETOOTH) and/or near-field communication (NFC). However, additional, or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations 1 develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 24 may include one or more antennas and/or communication transceivers for receiving and/or transmitting signals, such as cooperative sensing messages (CSMs). The vehicle communication system 24 is configured to wirelessly communicate information between the vehicle 12 and another vehicle. Further, the vehicle communication system 24 is configured to wirelessly communicate information between the vehicle 12 and infrastructure or other vehicles. It should be understood that the vehicle communication system 24 may be integrated with the vehicle controller 18 (e.g., on a same circuit board with the vehicle controller 18 or otherwise a part of the vehicle controller 18) without departing from the scope of the present disclosure.

With continued reference to FIG. 1, the server system 16 includes a server controller 26*a* in electrical communication with a map database 28 and a server communication system 30. In a non-limiting example, the server system 16 is located in a server farm, datacenter, or the like, and connected to the internet using the server communication system 30. The server controller 26*a* includes at least one server processor 26*b* and a server non-transitory computer readable storage device or server media 26*c*. The description of the type and configuration given above for the vehicle controller 18 also applies to the server controller 26*a*. In some examples, the server controller 26*a* may differ from the vehicle controller 18 in that the server controller 26*a* is capable of a higher processing speed, includes more memory, includes more inputs/outputs, and/or the like. In a non-limiting example, the server processor 26*b* and server media 26*c* of the server controller 26*a* are similar in structure and/or function to the processor and the media of the vehicle controller 18, as described above.

The map database 28 is used to store map data about roadways, including, for example, lane line map data, as will be discussed in greater detail below. The server communication system 30 is used to communicate with external systems, such as, for example, the vehicle controller 18 via the vehicle communication system 24. In a non-limiting example, the server communication system 30 is similar in structure and/or function to the vehicle communication system 24 of the vehicle system 14, as described above. In some examples, the server communication system 30 may differ from the vehicle communication system 24 in that the server communication system 30 is capable of higher power signal transmission, more sensitive signal reception, higher bandwidth transmission, additional transmission/reception protocols, and/or the like.

Figure 2:
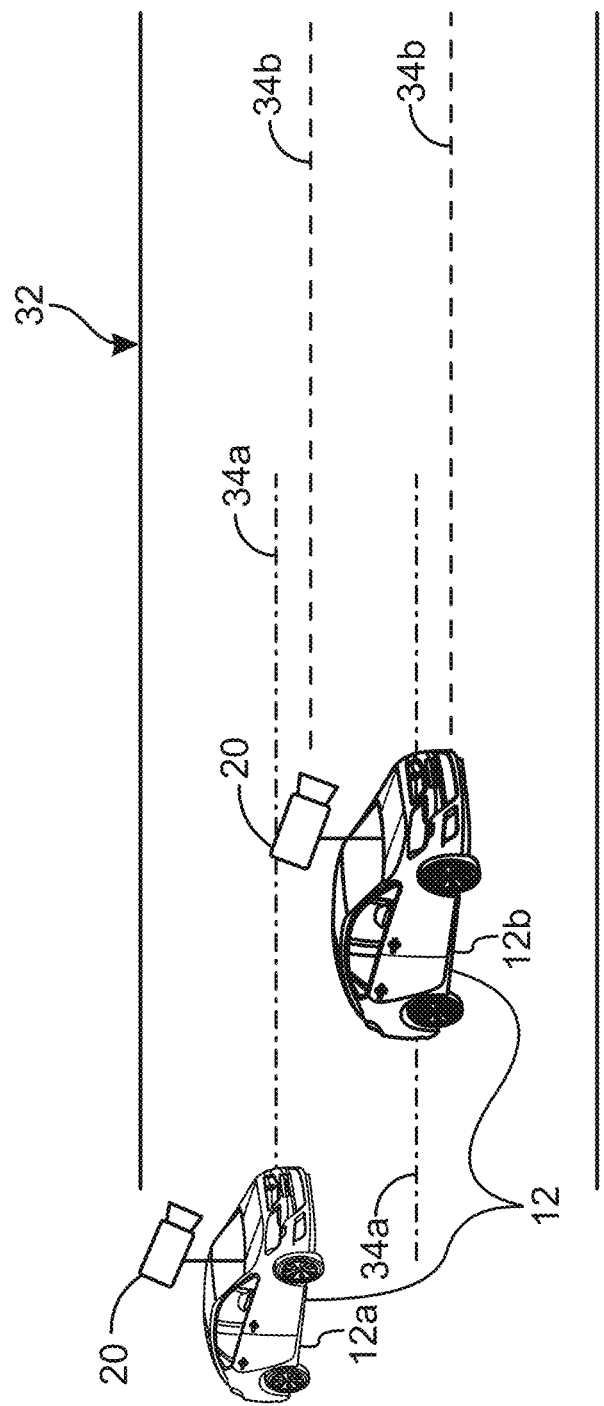
FIG. 2 is a schematic diagram of multiple vehicles travelling on a roadway showing misalignment between lane lines, according to an exemplary embodiment.

Referring to FIG. 2, a schematic diagram of multiple vehicles travelling on a roadway showing misalignment between lane lines is shown. When traveling on a roadway 32, a first vehicle 12*a* uses the camera system 20 to determine a first lane line location 34*a* of lane lines on the roadway 32. In the scope of the present disclosure, lane lines are lines on the roadway 32 which are configured to indicate edges of the roadway 32 and/or edges of lanes of the roadway 32. Lane lines may have multiple characteristics, including color (e.g., yellow or white), type (e.g., solid or dashed), and/or the like. A second vehicle 12*b* uses the camera system 20 to determine a second lane line location 34*b* of lane lines on the roadway 32. As illustrated in FIG. 2, even though the first vehicle 12*a* and the second vehicle 12*b* are traveling on the same roadway 32, the first lane line location 34*a* and the second lane line location 34*b* may be misaligned. Misalignment may occur due to factors such as, for example, GPS/GNSS error, poor lane line marking condition, inclement weather conditions, and/or the like. Therefore, the system 10 and method 100 of the present disclosure allow for alignment of lane line locations determined by multiple vehicles.

Figure 3A:
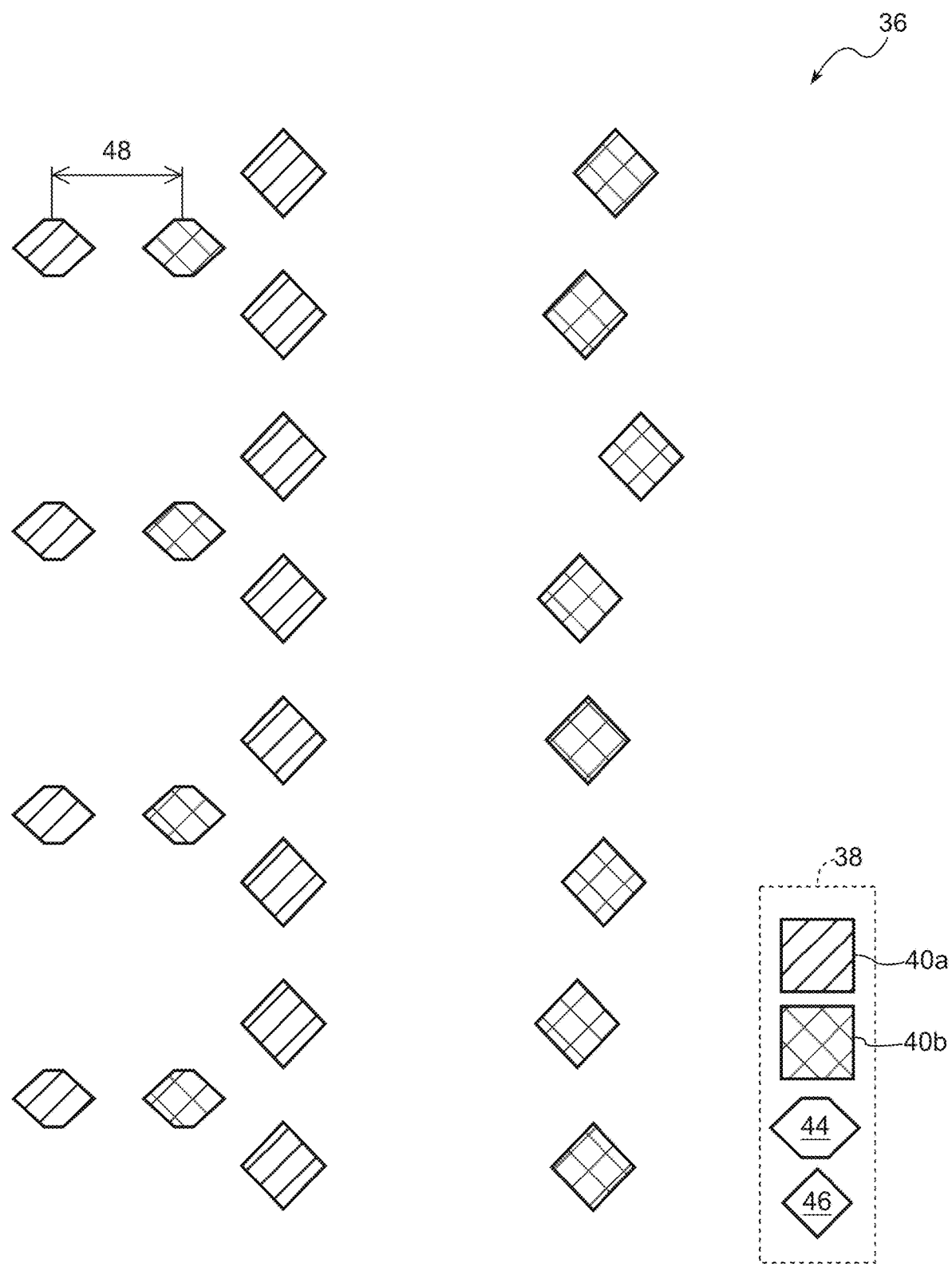
FIG. 3A is a schematic diagram of a plurality of observations according to an exemplary embodiment.

Referring to FIG. 3A, a schematic diagram of a plurality of observations 36 is shown. The plurality of observations 36 are observations of lane lines on the roadway 32 produced by the one or more vehicles 12, as will be discussed in greater detail below. FIG. 3A includes a key 38 which indicates the meaning of various shapes and hatch fills in FIG. 3A. Shapes having a diagonal hatch fill represent a first observation 40*a* of the plurality of observations 36. Shapes having a cross hatch fill represent a second observation 40*b* of the plurality of observations 36. Hexagons represent points defining a vehicle location trajectory 44 and diamonds represent points defining a right lane line 46. As shown in FIG. 3A, each of the plurality of observations 36 includes a plurality of points 46 and a vehicle location trajectory 44. Each of the plurality of points 46 corresponds to an object in the environment surrounding the one or more vehicles 12, for example, a portion of a lane line on the roadway 32. In the scope of the present disclosure, the vehicle location trajectory 44 represents locations of the one or more vehicles 12 at various points in time while recording the plurality of observations 36. Each of the plurality of points 46 includes a plurality of point characteristics. In an exemplary embodiment, the plurality of point characteristics includes information about the lane line at the location of a given point. In a non-limiting example, the plurality of point characteristics includes a lane line color (e.g., yellow or white), a lane line type (e.g., solid, dashed, single, or double), a lane line location relative to traffic direction (e.g., left relative to southbound vehicles), a location of the point relative to the vehicle location trajectory 44, and/or the like. As discussed above in reference to FIG. 2, misalignment between detected lane lines may be present, as is also visible in FIG. 3A.

In the scope of the present disclosure, the point cloud registration algorithm is used to determine a point cloud alignment vector 48 which may be used to align the second observation 40b with the first observation 40a. In an exemplary embodiment, the point cloud registration algorithm iteratively shifts the vehicle location trajectory 44 of the second observation 40b towards the vehicle location trajectory 44 of the first observation 40a until the second observation 40b is aligned with the first observation 40a. The total distance by which the second observation 40b is shifted towards the first observation 40a by the point cloud registration algorithm is referred to as the point cloud alignment vector 48. While the example in FIG. 3A shows the point cloud alignment vector 48 in one direction (i.e., a horizontal direction), it should be understood that the point cloud registration algorithm may shift the second observation 40b in one or more directions (e.g., a vertical and a horizontal direction) without departing from the scope of the present disclosure. In a non-limiting example, the point cloud registration algorithm is an algorithm as described in, for example, U.S. application Ser. No. 18/359,017, titled "CROWD-SOURCING LANE LINE MAPS FOR A VEHICLE", filed on Jul. 26, 2023, the entire contents of which is hereby incorporated by reference. In another non-limiting example, the point cloud registration algorithm is an iterative closest point (ICP) algorithm. It should be understood that various additional algorithms for aligning point clouds are within the scope of the present disclosure.

Figure 3B:
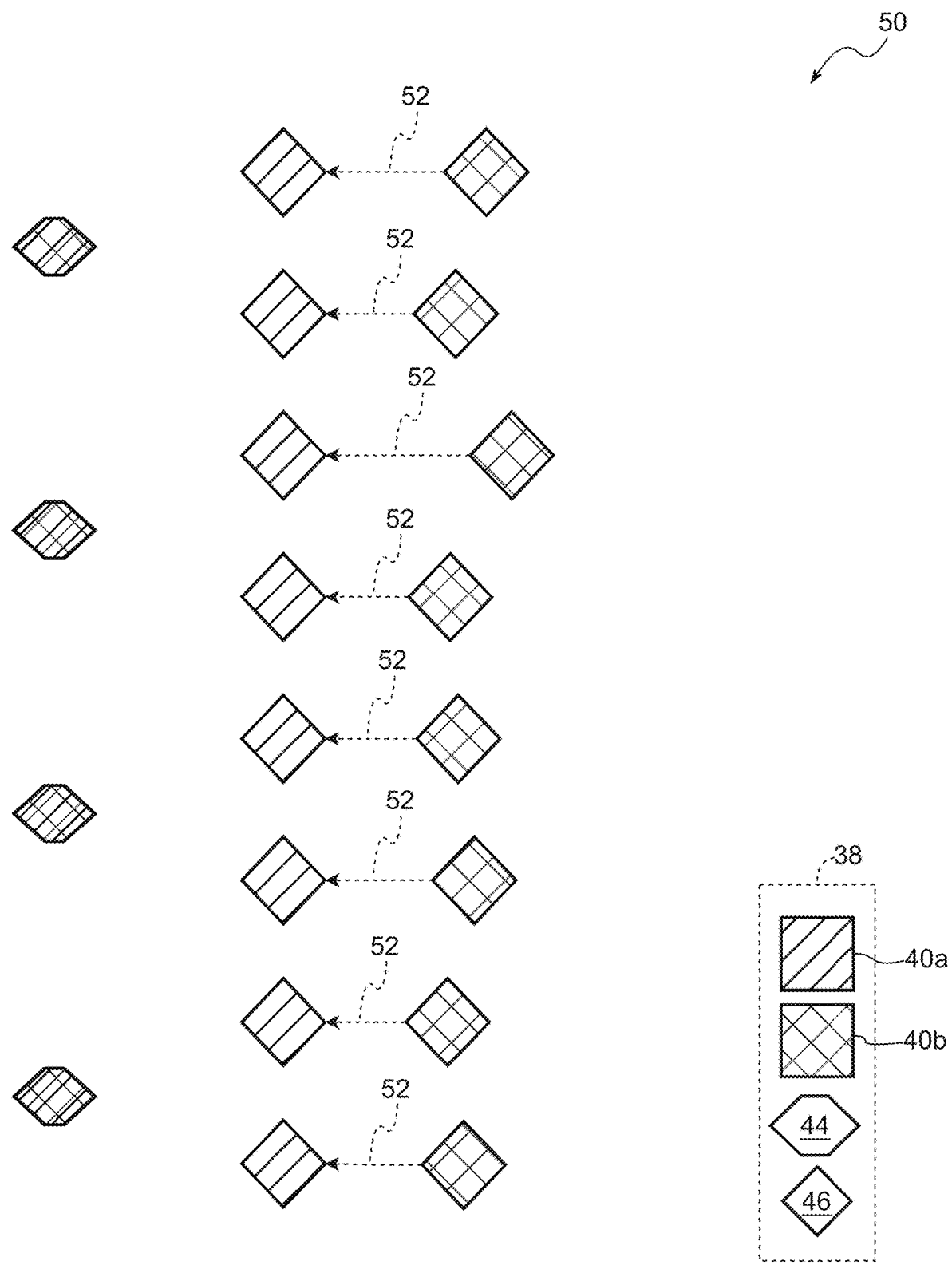
FIG. 3B is a schematic diagram of an exemplary aligned point cloud after shifting the second observation shown in FIG. 3A by a point cloud alignment vector, according to an exemplary embodiment.

Referring to FIG. 3B, a schematic diagram of an exemplary aligned point cloud 50 after shifting the second observation 40b by the point cloud alignment vector 48 is shown. As shown in FIG. 3B, the vehicle location trajectory 44 of the first observation 40a is coincident (i.e., overlapping) with the vehicle location trajectory 44 of the second observation 40b. In an exemplary embodiment, deviations in the alignment of the plurality of points 46 remain. In a non-limiting example, the deviations are caused by, for example, GPS/GNSS error, measurement error/variation, misalignment errors caused by sparse data, and/or the like. Therefore, the method 100 is used to determine a plurality of correction vectors 52 which are used to shift each of the plurality of points 46 of the second observation 40b to generate an optimized aligned point cloud, as will be discussed in greater detail below.

Figure 4:
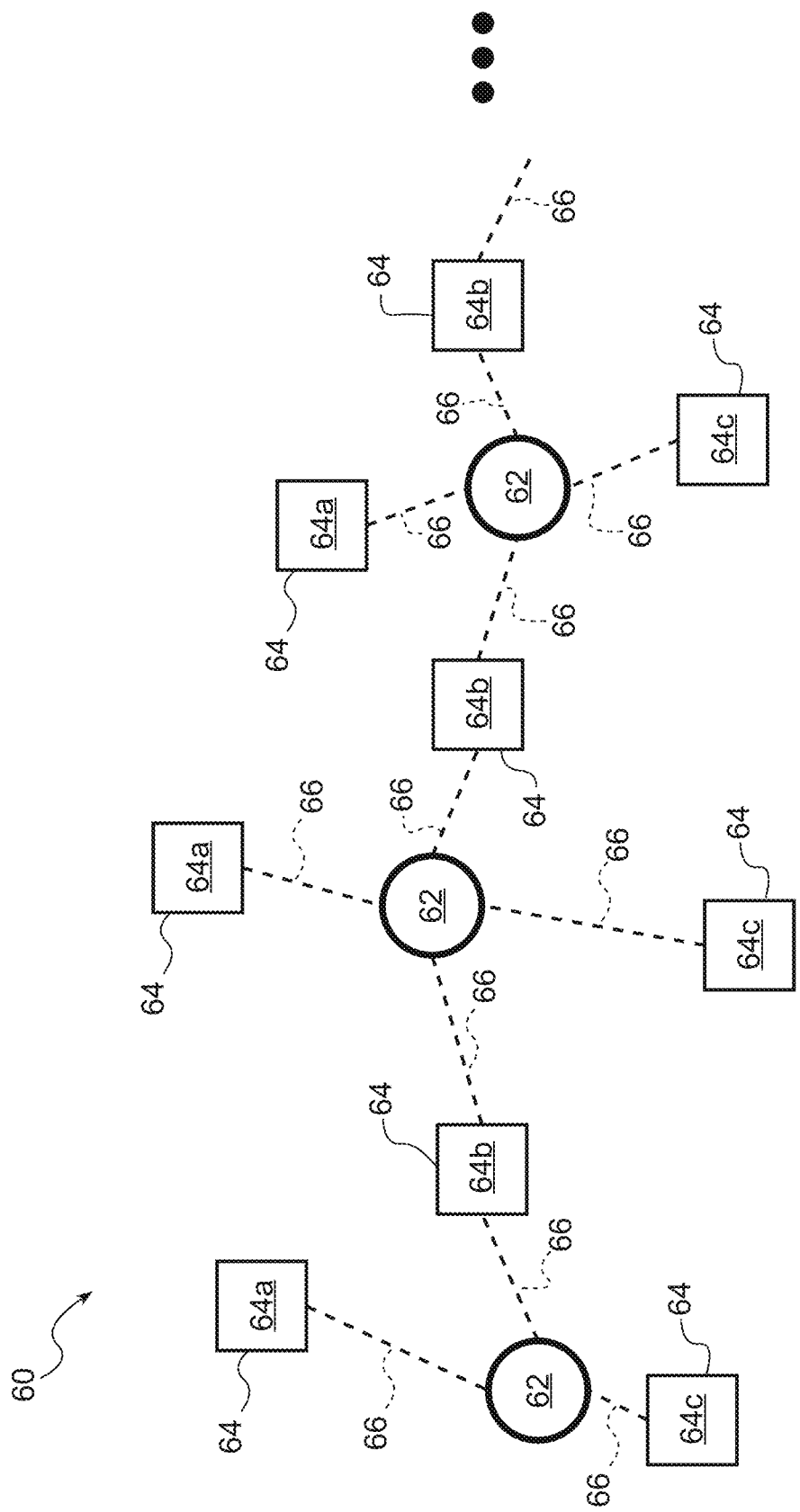
FIG. 4 is a schematic diagram of a factor graph, according to an exemplary embodiment.

Referring to FIG. 4, a schematic diagram of a factor graph 60 is shown. The factor graph 60 is a visual representation of an iterative optimization algorithm used to determine the optimal value for each of the plurality of correction vectors 52. The factor graph 60 includes a plurality of variable nodes 62, a plurality of factor nodes 64, and a plurality of edges 66. The plurality of variable nodes 62 represent the plurality of correction vectors 52. The plurality of factor nodes 64 represent a plurality of optimization constraints. In the scope of the present disclosure, the plurality of optimization constraints help to guide the optimization algorithm towards an optimal solution. In a non-limiting example, the plurality of optimization constraints includes at least: an observation similarity constraint, a trajectory pose constraint, and a location vicinity constraint. In an exemplary embodiment, a first factor node 64a of the plurality of factor nodes 64 represents the observation similarity constraint. A second factor node 64b of the plurality of factor nodes 64 represents the trajectory pose constraint. A third factor node 64c of the plurality of factor nodes 64 represents the location vicinity constraint.

The observation similarity constraint means that applying the plurality of correction vectors 52 to the plurality of points 46 of the second observation 40b should move the second observation 40b towards another, similar observation (e.g., the first observation 40a). The trajectory pose constraint means that applying the plurality of correction vectors 52 to the plurality of points 46 of the second observation 40b should not result in a significant change in a trajectory of the plurality of points 46 of the second observation 40b. The location vicinity constraint means that applying the plurality of correction vectors 52 to the plurality of points 46 of the second observation 40b should not move the second observation 40b far away from an original location (e.g., GPS position) of the second observation 40b before application of the plurality of correction vectors 52.

The plurality of edges 66 represent a plurality of cost functions. The plurality of cost functions quantify the relationships between the plurality of constraints (i.e., the plurality of factor nodes 64) and the plurality of correction vectors 52 (i.e., the plurality of variable nodes 62). In an exemplary embodiment, the plurality of cost functions includes an observation similarity constraint cost function, a trajectory pose constraint cost function, and a location vicinity constraint cost function.

In an exemplary embodiment, the observation similarity constraint cost function is proportional to $c_i - C_i$:

$$\text{Cost}_{ob}(c_i) \propto c_i - C_i \qquad (1)$$

where $\text{Cost}_{ob}(c_i)$ is the observation similarity constraint cost function for one of the plurality of correction vectors 52 corresponding to an ith point of the plurality of points 46 of the second observation 40b, $c_i$ is one of the plurality of correction vectors 52 corresponding to an ith point of the plurality of points 46 of the second observation 40b, and $C_i$ is the point cloud alignment vector 48 for the ith point of the plurality of points 46 of the second observation 40b.

In a non-limiting example, the observation similarity constraint cost function is:

$$\text{Cost}_{ob}(c_i) = \frac{c_i - C_i}{\sigma_{ob}^2(i)} \qquad (2)$$

where $\sigma_{ob}^2(i)$ is an alignment variance of the ith point of the plurality of points 46 of the second observation 40b.

In an exemplary embodiment, the trajectory pose constraint cost function is proportional to $f_{pose}(c_i,c_{i+1})-f_{pose}(\dot{c}_i,\dot{c}_{i+1})$:

$$\text{Cost}_{pose}(c_i) \propto f_{pose}(c_i, c_{i+1}) - f_{pose}(\dot{c}_i, \dot{c}_{i+1}) \quad (3)$$

where $\text{Cost}_{pose}(c_i)$ is the trajectory pose constraint cost function for one of the plurality of correction vectors 52 corresponding to the ith point of the plurality of points 46 of the second observation 40b, $c_i$ is one of the plurality of correction vectors 52 corresponding to the ith point of the plurality of points 46 of the second observation 40b, $\dot{c}_i$ is an initial correction vector (e.g., zero) corresponding to the ith point of the plurality of points 46 of the second observation 40b, $f_{pose}(c_i,c_{i+1})$ is a heading and/or distance between the ith point of the plurality of points 46 of the second observation 40b and an i+1th point of the plurality of points 46 of the second observation 40b after application of one of the plurality of correction vectors 52, and $f_{pose}(\dot{c}_i,\dot{c}_{i+1})$ is a heading and/or distance between the ith point of the plurality of points 46 of the second observation 40b and the i+1th point of the plurality of points 46 of the second observation 40b after application of the initial correction vector and before application of one of the plurality of correction vectors 52.

In a non-limiting example, the trajectory pose constraint cost function is:

$$\text{Cost}_{pose}(c_i) = \frac{f_{pose}(c_i, c_{i+1}) - f_{pose}(\dot{c}_i, \dot{c}_{i+1})}{\sigma_{pose}^2(i)} \quad (4)$$

where $\sigma_{pose}^2(i)$ is a pose variance of the ith point of the plurality of points 46 of the second observation 40b.

In an exemplary embodiment, the location vicinity constraint cost function is proportional to euclidian($c_i,\dot{c}_i$):

$$\text{Cost}_{loc}(c_i) \propto \text{euclidian}(c_i, \dot{c}_i) \quad (5)$$

where $\text{Cost}_{loc}(c_i)$ is the location vicinity constraint cost function for one of the plurality of correction vectors 52 corresponding to the ith point of the plurality of points 46 of the second observation 40b, $c_i$ is one of the plurality of correction vectors 52 corresponding to the ith point of the plurality of points 46 of the second observation 40b, $\dot{c}_i$ is the initial correction vector corresponding to the ith point of the plurality of points 46 of the second observation 40b, and euclidian($c_i,\dot{c}_i$) is a Euclidean distance between a location of the ith point after application of one of the plurality of correction vectors 52 and a location of the ith point after application of the initial correction vector and before application of one of the plurality of correction vectors 52.

In a non-limiting example, the location vicinity constraint cost function is:

$$\text{Cost}_{loc}(c_i) = \frac{\text{euclidian}(c_i, \dot{c}_i)}{\sigma_{loc}^2(i)} \quad (6)$$

where $\sigma_{loc}^2(i)$ is a location variance of the ith point of the plurality of points 46 of the second observation 40b.

The plurality of variable nodes 62, the plurality of factor nodes 64, and the plurality of edges 66 of the factor graph 60 may also be represented as an objective function. In an exemplary embodiment, the objective function is:

$$F(c_1, c_2, \ldots, c_n) = \sum_{c_i}\left(\text{Cost}_{ob}(c_i)^2 + \text{Cost}_{pose}(c_i)^2 + \text{Cost}_{loc}(c_i)^2\right) \quad (7)$$

where $F(c_1, c_2, \ldots, c_n)$ is the objective function, $c_1, c_2, \ldots, c_n$ are the plurality of correction vectors 52, $c_i$ is one of the plurality of correction vectors 52 corresponding to the ith point of the plurality of points 46 of the second observation 40b, $\text{Cost}_{ob}(c_i)$ is the observation similarity constraint cost function for one of the plurality of correction vectors 52 corresponding to the ith point of the plurality of points 46 of the second observation 40b, $\text{Cost}_{pose}(c_i)$ is the trajectory pose constraint cost function for one of the plurality of correction vectors 52 corresponding to the ith point of the plurality of points 46 of the second observation 40b, and $\text{Cost}_{loc}(c_i)$ is the location vicinity constraint cost function for one of the plurality of correction vectors 52 corresponding to the ith point of the plurality of points 46 of the second observation 40b.

To determine the value of each of the plurality of correction vectors 52, the objective function is minimized:

$$c_1, c_2, \ldots, c_n = \underset{c_1, c_2, \ldots, c_n}{\text{argmin}} [F(c_1, c_2, \ldots, c_n)] \quad (8)$$

In an exemplary embodiment, the server controller 26a uses one or more optimization algorithms, such as, for example, gradient descent, genetic algorithms, hill climbing algorithms, Bayesian algorithms, and/or the like to minimize the objective function (Equation 7). In another exemplary embodiment, the server controller 26a uses an iterative optimization algorithm, such as, for example, a factor graph optimization algorithm, to minimize the objective function (Equation 7). In a non-limiting example, the factor graph optimization algorithm iteratively updates the plurality of variable nodes 62 (i.e., the plurality of correction vectors 52) in the factor graph 60 to minimize the objective function (Equation 7).

The factor graph optimization algorithm iteratively updates the plurality of variable nodes 62 based on the plurality of factor nodes 64 and the plurality of edges 66 of the factor graph 60 using optimization techniques. In a non-limiting example, message-passing algorithms (e.g., belief propagation) and/or optimization solvers (e.g., gradient descent) are used to find the optimal values for the plurality of variable nodes 62 (i.e., the plurality of correction vectors 52) that satisfy the plurality of constraints based on the plurality of factor nodes 64 and minimize the objective function (Equation 7).

In an exemplary embodiment, the factor graph optimization algorithm is complete when a convergence condition is satisfied. In a non-limiting example, the convergence condition is satisfied when further modification of the plurality of variable nodes 62 results in an increase of the objective function (Equation 7). In another non-limiting example, the convergence condition is satisfied when the objective function (Equation 7) is less than or equal to a predetermined objective function threshold value. In another non-limiting example, the convergence condition is satisfied after completion of a predetermined quantity of iterations.

Figure 5:
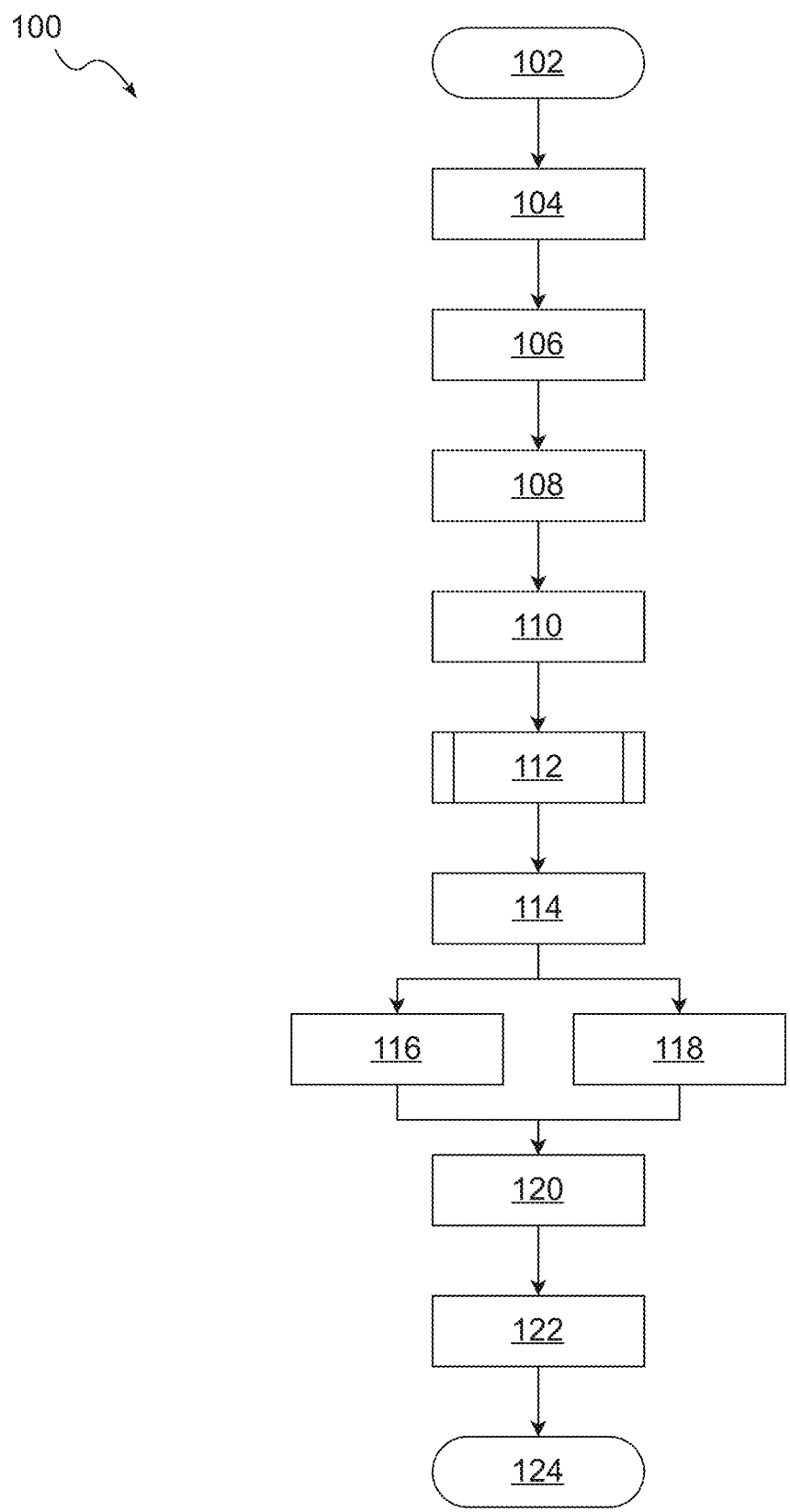
FIG. 5 is a flowchart of a method for crowd-sourcing lane line map data, according to an exemplary embodiment.

Referring to FIG. 5, a flowchart of the method 100 for crowd-sourcing lane line map data is shown. The method 100 begins at block 102 and proceeds to block 104. With reference to FIG. 5 and continued reference to FIG. 3A, at block 104, the one or more vehicles 12 perform the plurality of observations 36 using the vehicle system 14. In an exemplary embodiment, the each of the plurality of observations 36 includes one or more lane lines (e.g., a left lane line and/or the right lane line 46) and the vehicle location trajectory 44 on the roadway 32. In a non-limiting example, the one or more lane lines are captured using the camera system 20. For example, the vehicle controller 18 uses the camera system 20 to capture a plurality of images of the roadway 32. The vehicle controller 18 then uses a computer vision algorithm to identify the one or more lane lines in the plurality of images of the roadway 32. The one or more lane lines are then segmented into a plurality of points (e.g., the plurality of points 46), such that each of the plurality of points corresponds to a portion of the one or more lane lines. The plurality of point characteristics is determined for each of the plurality of points, using, for example, the computer vision algorithm. In a non-limiting example, the vehicle location trajectory 44 is determined using the GNSS 22 of the vehicle system 14. The vehicle location trajectory 44 represents a location track of the vehicle 12 during each of the plurality of observations. It should be understood that the plurality of observations 36 may be performed by one or more vehicles 12. The plurality of observations 36 may include multiple observations of the same geographical location and/or multiple observations of different geographical locations without departing from the scope of the present disclosure. After block 104, the method 100 proceeds to block 106.

At block 106, the plurality of observations performed at block 104 are transmitted from the one or more vehicles 12 to the server system 16. In an exemplary embodiment, each of the one or more vehicles 12 uses the vehicle communication system 24 of the vehicle system 14 to transmit one or more observations to the server communication system 30 of the server system 16. After block 106, the method 100 proceeds to block 108.

At block 108, the server system 16 receives the plurality of observations transmitted at block 106 using the server communication system 30. After block 108, the method 100 proceeds to block 110.

At block 110, the server system 16 generates the point cloud alignment vector 48 using the point cloud registration algorithm as discussed above. In an exemplary embodiment, the point cloud alignment vector 48 is the total distance and direction by which the second observation 40b must be shifted towards the first observation 40a in order to align the second observation 40b with the first observation 40a. In a non-limiting example, the point cloud registration algorithm uses an iterative method to determine the point cloud alignment vector 48, as discussed above. After block 110, the method 100 proceeds to block 112.

At block 112, the server system 16 generates an optimized aligned point cloud based at least in part on the point cloud alignment vector 48 determined at block 110 and the plurality of observations received at block 108, as will be discussed in greater detail below. After block 112, the method 100 proceeds to block 114.

At block 114, the server system 16 determines a lane line map based at least in part on the optimized aligned point cloud determined at block 112. In the scope of the present disclosure, a lane line map is data defining one or more lane lines at a particular geographic location on a roadway. In a non-limiting example, the lane line map includes mathematical and/or geometrical equations which define a continuous line representing a shape, size, arrangement, location, and/or the like of the one or more lane lines. The lane line map also includes characteristics of the one or more lane lines, such as, for example, color, type, and/or the like. It should be understood that the lane line map may include additional elements, such as, for example, additional painted markings, road edges (i.e., boundaries between paved surfaces and unpaved surfaces), virtual lane lines (i.e., computer-inferred lane lines where painted lane lines are not present, for example, within an intersection), and/or additional objects, markings, and characteristics of roadways without departing from the scope of the present disclosure. Additionally, it should be understood that the system 10 and method 100 disclosed herein are applicable to the additional elements of lane line maps disclosed above in addition to the one or more lane lines. In an exemplary embodiment, to determine a lane line map, the server controller 26a uses a hill climbing algorithm, as discussed in U.S. application Ser. No. 17/930,503, titled "HILL CLIMBING ALGORITHM FOR CONSTRUCTING A LANE LINE MAP", filed on Sep. 8, 2022, the entire contents of which is hereby incorporated by reference. It should be understood that any method for determining a mathematical equation describing one or more lane lines based on a point cloud is within the scope of the present disclosure. After block 114, the method 100 proceeds to blocks 116 and 118.

At block 116, the server controller 26a updates the map database 28. In an exemplary embodiment, the server controller 26a saves the lane line map determined at block 114 to the map database 28. After block 116, the method 100 proceeds to block 120, as will be discussed in greater detail below.

At block 118, the server controller 26a uses the server communication system 30 to transmit the lane line map determined at block 114 to the one or more vehicles 12. After block 118, the method 100 proceeds to block 120.

At block 120, the one or more vehicles 12 receive the lane line map transmitted at block 118. After block 120, the method 100 proceeds to block 122.

At block 122, the one or more vehicles 12 takes action based at least in part on the lane line map received at block 120. In an exemplary embodiment, the action includes adjusting an operation of the vehicle 12. In a non-limiting example, adjusting the operation of the vehicle 12 includes adjusting the operation of an automated driving system of the vehicle 12. For example, a pathfinding module of the automated driving system may utilize the lane line map to adjust a path of the vehicle 12. In another non-limiting example, adjusting the operation of the vehicle 12 includes adjusting an operation of an advanced driver assistance system (ADAS), such as, for example, lane keeping system and/or a lane departure warning system. In another non-limiting example, adjusting the operation of the vehicle 12 includes providing a notification and/or visual display of the one or more lanes to an occupant of the vehicle 12 using a display, such as, for example, a head-up display (HUD). After block 122, the method 100 proceeds to enter a standby state at block 124.

Figure 6:
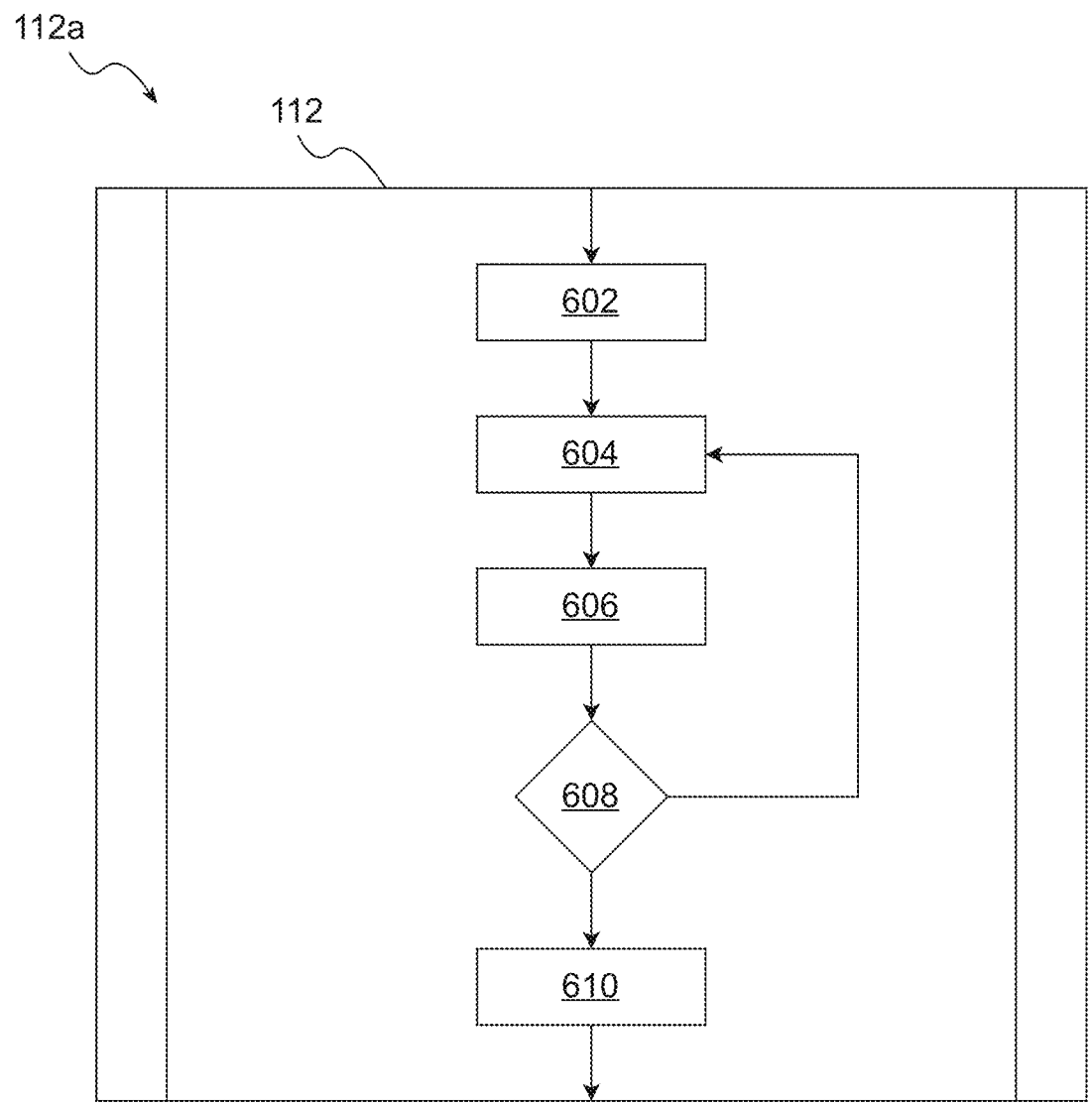
FIG. 6 is a flowchart of a method for generating an optimized aligned point cloud, according to an exemplary embodiment.

Referring to FIG. 6, a flowchart of an exemplary embodiment 112a of block 112 of the method 100 is shown. With reference to FIGS. 4 and 6, the exemplary embodiment 112a begins at block 602. At block 602, the server system 16 generates the factor graph 60, as discussed above in reference to FIG. 4. In an exemplary embodiment, the factor graph 60 is generated based on the plurality of correction vectors 52, the plurality of constraints, and the plurality of cost functions, as discussed above. After block 602, the exemplary embodiment 112a proceeds to block 604.

At block 604, the server system 16 updates one or more of the plurality of variable nodes 62 (i.e., one or more of the plurality of correction vectors 52) of the factor graph 60 generated at block 602. In an exemplary embodiment, the one or more of the plurality of variable nodes 62 are iteratively updated based on the factor graph 60. In another exemplary embodiment, the one or more of the plurality of variable nodes 62 are iteratively updated to decrease a value of one or more of the plurality of cost functions (Equations 2, 4, 6). In another exemplary embodiment, the one or more of the plurality of variable nodes 62 are iteratively updated to decrease the value of the objective function (Equation 7). In the scope of the present disclosure, updating one or more of the plurality of variable nodes 62 includes, for example, increasing or decreasing a magnitude and/or a direction of one or more of the plurality of correction vectors 52. After block 604, the exemplary embodiment 112a proceeds to block 606.

At block 606, the server system 16 evaluates the plurality of cost functions (Equations 2, 4, 6) and the objective function (Equation 7) based at least in part on the plurality of correction vectors 52 as updated at block 604. After block 606, the exemplary embodiment 112a proceeds to block 608.

At block 608, the server system 16 evaluates whether the convergence condition has been satisfied, as discussed above. In a non-limiting example, the convergence condition is satisfied when further modification of the plurality of variable nodes 62 would result in an increase of the value of the objective function (Equation 7). In another non-limiting example, the convergence condition is satisfied when the value of the objective function (Equation 7) is less than or equal to the predetermined objective function threshold value. In another non-limiting example, the convergence condition is satisfied after completion of the predetermined quantity of iterations (e.g., one thousand iterations). If the convergence condition is not satisfied, the exemplary embodiment 112a returns to block 604 for further modification of one or more of the plurality of variable nodes 62 (i.e., one or more of the plurality of correction vectors 52) of the factor graph 60. If the convergence condition is satisfied, the exemplary embodiment 112a proceeds to block 610.

At block 610, the server system 16 applies the plurality of correction vectors 52 determined at blocks 602, 604, and 606 to each of the plurality of points 46 of the second observation 40b to generate the optimized aligned point cloud. In an exemplary embodiment, the server system 16 shifts the location of each of the plurality of points 46 of the second observation 40b relative to the vehicle location trajectory 44 of the second observation 40b by the one of the plurality of correction vectors 52. After block 610, the exemplary embodiment 112a is concluded, and the method 100 proceeds as discussed above.

The system 10 and method 100 of the present disclosure offer several advantages. Using the system 10 and method 100, lane line maps may be constructed from crowd-sourced data (i.e., data provided by many vehicles). The system 10 and method 100 allow data captured by different vehicles, with various equipment, at different times, in varying environmental conditions, and with varying data quality to be aggregated to produce accurate lane line maps. The use of the factor graph optimization algorithm allows for increased accuracy and reduction of misalignments between observations. The lane line maps are subsequently used to update stored map databases and transmitted to vehicles for use by vehicle systems such as automated driving systems (ADS), advanced driver assistance systems (ADAS), and the like.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for crowd-sourcing lane line map data for a vehicle, the method comprising:
   receiving a plurality of observations from one or more vehicles, wherein the plurality of observations includes at least a first observation and a second observation, wherein each of the plurality of observations includes a vehicle location trajectory and a plurality of points positioned relative to the vehicle location trajectory, wherein each point of the plurality of points includes a plurality of point characteristics, wherein one of the plurality of point characteristics is a location of each point relative to the vehicle location trajectory, and wherein each of the plurality of points corresponds to an object in an environment surrounding the one or more vehicles;
   generating a point cloud alignment vector based at least in part on the plurality of observations using a point cloud registration algorithm, wherein the point cloud alignment vector is determined such that shifting the vehicle location trajectory of the second observation by the point cloud alignment vector aligns the vehicle location trajectory of the second observation with the vehicle location trajectory of the first observation;
   generating an optimized aligned point cloud based at least in part on the point cloud alignment vector, wherein generating the optimized aligned point cloud further comprises:
      determining a plurality of correction vectors, wherein each of the plurality of correction vectors corresponds to one of the plurality of points of the second observation, wherein determining the plurality of correction vectors further comprises minimizing an objective function to determine the plurality of correction vectors, wherein the objective function includes at least a plurality of cost functions, wherein each of the plurality of cost functions corresponds to one of a plurality of optimization constraints, and wherein the plurality of cost functions include:
         an observation similarity constraint cost function, wherein the observation similarity constraint cost function is:

$$\text{Cost}_{ob}(c_i) = \frac{c_i - C_i}{\sigma_{ob}^2(i)}$$

wherein $\text{Cost}_{ob}(c_i)$ is the observation similarity constraint cost function for one of the plurality of correction vectors corresponding to an ith point of the plurality of points of the second observation, $c_i$ is one of the plurality of correction vectors corresponding to an ith point of the plurality of points of the second observation, $C_i$ is the point cloud alignment vector for the ith point of the plurality of points of the second observation, and $\sigma_{ob}^2(i)$ is an alignment variance of the ith point of the plurality of points of the second observation;

a trajectory pose constraint cost function, wherein the trajectory pose constraint cost function is:

$$\text{Cost}_{pose}(c_i) = \frac{f_{pose}(c_i, c_{i+1}) - f_{pose}(\dot{c}_i, \dot{c}_{i+1})}{\sigma_{pose}^2(i)}$$

wherein $\text{Cost}_{pose}(c_i)$ is the trajectory pose constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is an initial correction vector corresponding to the ith point of the plurality of points of the second observation, $f_{pose}(c_i, c_{i+1})$ is a heading between the ith point of the plurality of points of the second observation and an i+1th point of the plurality of points of the second observation after application of one of the plurality of correction vectors, $f_{pose}(\dot{c}_i, \dot{c}_{i+1})$ is a heading between the ith point of the plurality of points of the second observation and the i+1th point of the plurality of points of the second observation after application of the initial correction vector, and $\sigma_{pose}^2(i)$ is a pose variance of the ith point of the plurality of points of the second observation; and a location vicinity constraint cost function, wherein the location vicinity constraint cost function is:

$$\text{Cost}_{loc}(c_i) = \frac{\text{euclidian}(c_i, \dot{c}_i)}{\sigma_{loc}^2(i)}$$

wherein $\text{Cost}_{loc}(c_i)$ is the location vicinity constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is the initial correction vector corresponding to the ith point of the plurality of points of the second observation, euclidian($c_i, \dot{c}_i$), is a Euclidian distance between a location of the ith point after application of one of the plurality of correction vectors and a location of the ith point after application of the initial correction vector, and $\sigma_{loc}^2(i)$ is an location variance of the ith point of the plurality of points of the second observation; and shifting each of the plurality of points of the second observation to generate the optimized aligned point cloud, wherein each of the plurality of points of the second observation is shifted based at least in part on one of the plurality of correction vectors;

determining a lane line map based at least in part on the optimized aligned point cloud;

updating a map database based at least in part on the lane line map;

adjusting a path of the vehicle based at least in part on the lane line map; and controlling the vehicle to traverse the path using an automated driving system.

2. The method of claim 1, wherein minimizing the objective function further comprises:

minimizing the objective function to determine the plurality of correction vectors, wherein the objective function further includes:

$$F(c_1, c_2, \ldots, c_n) = \sum_{c_i} \left( \text{Cost}_{ob}(c_i)^2 + \text{Cost}_{pose}(c_i)^2 + \text{Cost}_{loc}(c_i)^2 \right)$$

wherein $F(c_1, c_2, \ldots, c_n)$ is the objective function, $c_1, c_2, \ldots, c_n$ are the plurality of correction vectors, $c_i$ is one of the plurality of correction vectors corresponding to the ith point of the plurality of points of the second observation, $\text{Cost}_{ob}(c_i)$ is the observation similarity constraint cost function for one of the plurality of correction vectors corresponding to the ith point of the plurality of points of the second observation, $\text{Cost}_{pose}(c_i)$ is the trajectory pose constraint cost function for one of the plurality of correction vectors corresponding to the ith point of the plurality of points of the second observation, and $\text{Cost}_{loc}(c_i)$ is the location vicinity constraint cost function for one of the plurality of correction vectors corresponding to the ith point of the plurality of points of the second observation.

3. The method of claim 2, wherein minimizing the objective function to determine the plurality of correction vectors further comprises:

adjusting the plurality of correction vectors using an iterative optimization algorithm to minimize the objective function.

4. The method of claim 3, wherein the iterative optimization algorithm is a factor graph optimization algorithm, and wherein adjusting the plurality of correction vectors using the iterative optimization algorithm further comprises:

generating a factor graph, wherein the factor graph includes a plurality of variable nodes, a plurality of factor nodes, and a plurality of edges linking variable nodes and factor nodes, wherein each of the plurality of variable nodes represents one of the plurality of correction vectors, wherein each of the plurality of factor nodes represents one of the plurality of optimization constraints, and wherein each of the plurality of edges represents one of the plurality of cost functions; and updating one or more of the plurality of variable nodes using an iterative process until a convergence condition is satisfied.

5. A system for crowd-sourcing lane line map data for a vehicle, the system comprising:

a server communication system;

a map database;

an automated driving system; and a server controller in electrical communication with the server communication system, the map database, and the automated driving system, wherein the server controller is programmed to:

receive a plurality of observations from one or more vehicles using the server communication system, wherein the plurality of observations includes at least a first observation and a second observation, wherein each of the plurality of observations includes a vehicle location trajectory and a plurality of points positioned relative to the vehicle location trajectory, wherein each point of the plurality of points includes a plurality of point characteristics, wherein one of the plurality of point characteristics is a location of each point relative to the vehicle location trajectory, and wherein each of the plurality of points corresponds to an object in an environment surrounding the one or more vehicles;

generate a point cloud alignment vector based at least in part on the plurality of observations;

generate an optimized aligned point cloud based at least in part on the point cloud alignment vector, wherein to generate the optimized aligned point cloud, the server controller is further programmed to:

minimize an objective function to determine a plurality of correction vectors, wherein each of the plurality of correction vectors corresponds to one of the plurality of points of the second observation, wherein the objective function includes at least a plurality of cost functions, wherein each of the plurality of cost functions depends at least in part on the plurality of correction vectors, wherein each of the plurality of cost functions corresponds to one of a plurality of optimization constraints, and wherein the plurality of optimization constraints includes at least: an observation similarity constraint, a trajectory pose constraint, and a location vicinity constraint, wherein the plurality of cost functions further includes:

an observation similarity constraint cost function, wherein the observation similarity constraint cost function is:

$$\text{Cost}_{ob}(c_i) = \frac{c_i - C_i}{\sigma_{ob}^2(i)}$$

wherein $\text{Cost}_{ob}(c_i)$ is the observation similarity constraint cost function for one of the plurality of correction vectors corresponding to an ith point of the plurality of points of the second observation, $c_i$ is one of the plurality of correction vectors corresponding to an ith point of the plurality of points of the second observation, $C_i$ is the point cloud alignment vector for the ith point of the plurality of points of the second observation, and $\sigma_{ob}^2(i)$ is an alignment variance of the ith point of the plurality of points of the second observation;

a trajectory pose constraint cost function, wherein the trajectory pose constraint cost function is:

$$\text{Cost}_{pose}(c_i) = \frac{f_{pose}(c_i, c_{i+1}) - f_{pose}(\dot{c}_i, \dot{c}_{i+1})}{\sigma_{pose}^2(i)}$$

wherein $\text{Cost}_{pose}(c_i)$ is the trajectory pose constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is an initial correction vector corresponding to the ith point of the plurality of points of the second observation, $f_{pose}(c_i, c_{i+1})$ is a heading between the ith point of the plurality of points of the second observation and an i+1th point of the plurality of points of the second observation after application of one of the plurality of correction vectors, $f_{pose}(\dot{c}_i, \dot{c}_{i+1})$ is a heading between the ith point of the plurality of points of the second observation and the i+1th point of the plurality of points of the second observation after application of the initial correction vector, and $\sigma_{pose}^2(i)$ is a pose variance of the ith point of the plurality of points of the second observation; and a location vicinity constraint cost function, wherein the location vicinity constraint cost function is:

$$\text{Cost}_{loc}(c_i) = \frac{\text{euclidian}(c_i, \dot{c}_i)}{\sigma_{loc}^2(i)}$$

wherein $\text{Cost}_{loc}(c_i)$ is the location vicinity constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is the initial correction vector corresponding to the ith point of the plurality of points of the second observation, euclidian$(c_i, \dot{c}_i)$, is a Euclidian distance between a location of the ith point after application of one of the plurality of correction vectors and a location of the ith point after application of the initial correction vector, and $\sigma_{loc}^2(i)$ is an location variance of the ith point of the plurality of points of the second observation; and shift each of the plurality of points of the second observation to generate the optimized aligned point cloud, wherein each of the plurality of points of the second observation is shifted based at least in part on one of the plurality of correction vectors;

determine a lane line map based at least in part on the optimized aligned point cloud;

update the map database based at least in part on the lane line map;

adjust a path of the vehicle based at least in part on the lane line map; and control the vehicle to traverse the path using the automated driving system.

6. The system of claim 5, wherein:

the objective function is based at least in part on the plurality of cost functions, and wherein the objective function is:

$$F(c_1, c_2, \ldots, c_n) = \sum_{c_i} \left( \text{Cost}_{ob}(c_i)^2 + \text{Cost}_{pose}(c_i)^2 + \text{Cost}_{loc}(c_i)^2 \right)$$

wherein $F(c_1, c_2, \ldots, c_n)$ is the objective function, $c_1, c_2, \ldots, c_n$ are the plurality of correction vectors, $c_i$ is one of the plurality of correction vectors corresponding to the ith point of the plurality of points of the second observation, $\text{Cost}_{ob}(c_i)$ is the observation similarity constraint cost function for one of the plurality of correction vectors corresponding to the ith point of the plurality of points of the second observation, $\text{Cost}_{pose}(c_i)$ is the trajectory pose constraint cost function for one of the plurality of correction vectors corresponding to the ith point of the plurality of points of the second observation, and $\text{Cost}_{loc}(c_i)$ is the location vicinity constraint cost function for one of the plurality of correction vectors corresponding to the ith point of the plurality of points of the second observation.

7. The system of claim 6, wherein to minimize the objective function, the server controller is further programmed to:
generate a factor graph, wherein the factor graph includes a plurality of variable nodes, a plurality of factor nodes, and a plurality of edges linking variable nodes and factor nodes, wherein each of the plurality of variable nodes represents one of the plurality of correction vectors, wherein each of the plurality of factor nodes represents one of the plurality of optimization constraints, and wherein each of the plurality of edges represents one of the plurality of cost functions; and
update one or more of the plurality of variable nodes to determine the plurality of correction vectors using an iterative process until a convergence condition is satisfied.

8. A method for crowd-sourcing lane line map data for a vehicle, the method comprising:
receiving a plurality of observations from one or more vehicles, wherein each of the plurality of observations includes a vehicle location trajectory and a plurality of points positioned relative to the vehicle location trajectory, wherein each point of the plurality of points includes a plurality of point characteristics, wherein one of the plurality of point characteristics is a location of each point relative to the vehicle location trajectory, and wherein each of the plurality of points corresponds to an object in an environment surrounding the one or more vehicles;
generating a point cloud alignment vector based at least in part on the plurality of observations using a point cloud registration algorithm, wherein shifting the vehicle location trajectory of a second observation by the point cloud alignment vector aligns the vehicle location trajectory of the second observation with the vehicle location trajectory of a first observation;
determining a plurality of correction vectors, wherein each of the plurality of correction vectors corresponds to one of the plurality of points of the second observation, wherein determining the plurality of correction vectors further comprises:
determining an observation similarity constraint cost function based at least in part on an observation similarity constraint, wherein the observation similarity constraint cost function is:

$$\text{Cost}_{ob}(c_i) = \frac{c_i - C_i}{\sigma_{ob}^2(i)}$$

wherein $\text{Cost}_{ob}(c_i)$ is the observation similarity constraint cost function for one of the plurality of correction vectors corresponding to an ith point of the plurality of points of the second observation, $c_i$ is one of the plurality of correction vectors corresponding to an ith point of the plurality of points of the second observation, $C_i$ is the point cloud alignment vector for the ith point of the plurality of points of the second observation, and $\sigma_{ob}^2(i)$ is an alignment variance of the ith point of the plurality of points of the second observation;

determining a trajectory pose constraint cost function based at least in part on a trajectory pose constraint, wherein the trajectory pose constraint cost function is:

$$\text{Cost}_{pose}(c_i) = \frac{f_{pose}(c_i, c_{i+1}) - f_{pose}(\dot{c}_i, \dot{c}_{i+1})}{\sigma_{pose}^2(i)}$$

wherein $\text{Cost}_{pose}(c_i)$ is the trajectory pose constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is an initial correction vector corresponding to the ith point of the plurality of points of the second observation, $f_{pose}(c_i, c_{i+1})$ is a heading between the ith point of the plurality of points of the second observation and an i+1th point of the plurality of points of the second observation after application of one of the plurality of correction vectors, $f_{pose}(\dot{c}_i, \dot{c}_{i+1})$ is a heading between the ith point of the plurality of points of the second observation and the i+1th point of the plurality of points of the second observation after application of the initial correction vector, and $\sigma_{pose}^2(i)$ is a pose variance of the ith point of the plurality of points of the second observation;

determining a location vicinity constraint cost function based at least in part on a location vicinity constraint, wherein the location vicinity constraint cost function is:

$$\text{Cost}_{loc}(c_i) = \frac{\text{euclidian}(c_i, \dot{c}_i)}{\sigma_{loc}^2(i)}$$

wherein $\text{Cost}_{loc}(c_i)$ is the location vicinity constraint cost function for one of the plurality of correction vectors corresponding to the ith point of the plurality of points of the second observation, $c_i$ is one of the plurality of correction vectors corresponding to the ith point of the plurality of points of the second observation, $\dot{c}_i$ is the initial correction vector corresponding to the ith point of the plurality of points of the second observation, $\text{euclidian}(c_i, \dot{c}_i)$, is a Euclidean distance between a location of the ith point after application of one of the plurality of correction vectors and a location of the ith point after application of the initial correction vector, and $\sigma_{loc}^2(i)$ is an location variance of the ith point of the plurality of points of the second observation;

determining an objective function based at least in part on the observation similarity constraint cost function, the trajectory pose constraint cost function, and the location vicinity constraint cost function, wherein the objective function is:

$$F(c_1, c_2, \ldots, c_n) = \sum_{c_i} \left( \text{Cost}_{ob}(c_i)^2 + \text{Cost}_{pose}(c_i)^2 + \text{Cost}_{loc}(c_i)^2 \right)$$

wherein $F(c_1, c_2, \ldots, c_n)$ is the objective function, $c_1, c_2, \ldots, c_n$ are the plurality of correction vectors, $c_i$ is one of the plurality of correction vectors corresponding to the ith point of the plurality of points of the second observation, $\text{Cost}_{ob}(c_i)$ is the observation similarity constraint cost function for one of the plurality of correction vectors corresponding to the ith point of the plurality of points of the second observation, $\text{Cost}_{pose}(c_i)$ is the trajectory pose constraint cost function for one of the plurality of correction vectors corresponding to the ith point of the plurality of points of the second observation, and $\text{Cost}_{loc}(c_i)$ is the location vicinity constraint cost function for one of the plurality of correction vectors corresponding to the ith point of the plurality of points of the second observation; and minimizing the objective function to determine the plurality of correction vectors;

shifting each of the plurality of points of the second observation to generate an optimized aligned point cloud, wherein each of the plurality of points of the second observation is shifted based at least in part on one of the plurality of correction vectors;

determining a lane line map based at least in part on the optimized aligned point cloud;

updating a map database based at least in part on the lane line map;

adjusting a path of the vehicle based at least in part on the lane line map; and controlling the vehicle to traverse the path using an automated driving system.

9. The method of claim 8, minimizing the objective function further comprises:

generating a factor graph, wherein the factor graph includes a plurality of variable nodes, a plurality of factor nodes, and a plurality of edges linking variable nodes and factor nodes, wherein each of the plurality of variable nodes represents one of the plurality of correction vectors, wherein each of the plurality of factor nodes represents one of: the observation similarity constraint, the trajectory pose constraint, and the location vicinity constraint, and wherein each of the plurality of edges represents one of: the observation similarity constraint cost function, the trajectory pose constraint cost function, and the location vicinity constraint cost function; and updating one or more of the plurality of variable nodes using an iterative process until a convergence condition is satisfied.

* * * * *